July 23, 1968  M. MILES ET AL  3,393,568
METER DAMPING DEVICE
Filed July 15, 1966

INVENTORS
Marshall Miles
Joseph D. Northrup
Peter Wargo

By Norton Lesser

Attorney

3,393,568
METER DAMPING DEVICE
Marshall Miles, Wilmette, Joseph D. Northrup, Elk Grove, and Peter Wargo, Maywood, Ill., assignors to Stewart-Warner Corporation, Chicago, Ill., a corporation of Virginia
Filed July 15, 1966, Ser. No. 565,587
3 Claims. (Cl. 73—496)

ABSTRACT OF THE DISCLOSURE

The following specification describes a magnetically actuated U-shaped damper encapsulated in plastic and supported by a cantilever spring for engagement with the back wall of a speedometer speed cup each time the speedometer magnet passes the damper to thereby dampen the effect of ambient vibrations on the speedometer indicator needle.

---

This invention relates in general to apparatus for damping extraneous vibrations in magnet operated meters and more particularly to magnetically operated apparatus for damping extraneous vibrations in a speedometer.

Speedometers generally comprise a rotating permanent magnet which is driven from a flexible shaft, for example, in accordance with the speed of a vehicle. A rotatably mounted speed or aluminum cup surrounds the magnet and eddy currents are generated therein by the rotating magnet to rotate the cup through an arc corresponding to the magnet speed. A pointer or needle is associated with the shaft on which the cup is mounted and it is in turn rotated by the cup to indicate the speed of the vehicle.

Devices of this type have a wide variety of applications and while extraneous vibration in some instances may not be too distressing, there are a number of circumstances in which vibration results in severe needle oscillation or in walking of the needle from its true position, thereby preventing accurate indication. These circumstances may arise through whip in the flexible shaft or in the operation of heavy tracked vehicles or motorcycles.

Examination of the nature of the above problem reveals that an interruption in the rate of the applied extraneous vibrational forces tends to reduce their affect to negligible proportions. To accomplish this purpose the present invention utilizes a suspended magnetically susceptible material, which is periodically attracted to the rotating magnet. The attracted material engages the speed cup and thereby dampens the response of the cup to extraneous vibrations.

Accordingly, it is a primary object of the present invention to provide improved apparatus for use in a meter to damp extraneous vibrations.

It is another object of the present invention to provide more economical and effective apparatus cooperating with the magnet of a speedometer for damping or eliminating the effect of extraneous vibrations on a speedometer needle.

Other objects and features of the present invention will become apparent upon examination of the following specification and claims, together with the drawings, wherein:

Figure 1:
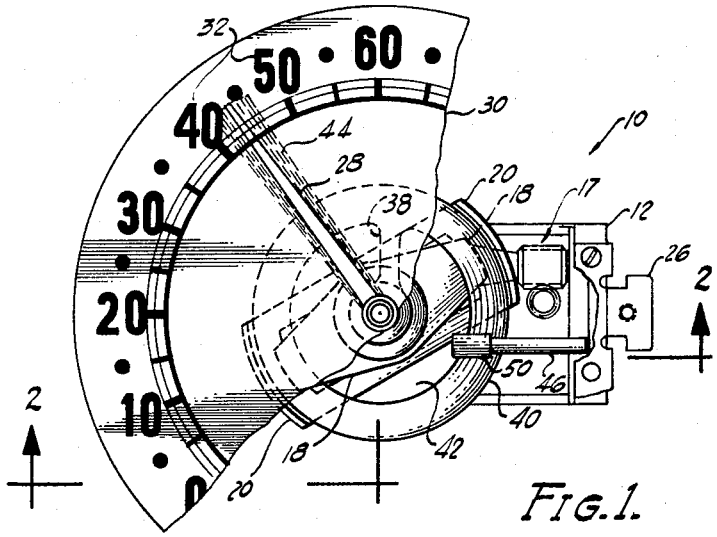
FIG. 1 is a front elevational view of a speedometer omitting a portion of the dial and other details, but incorporating the principles of the present invention.
Figure 2:
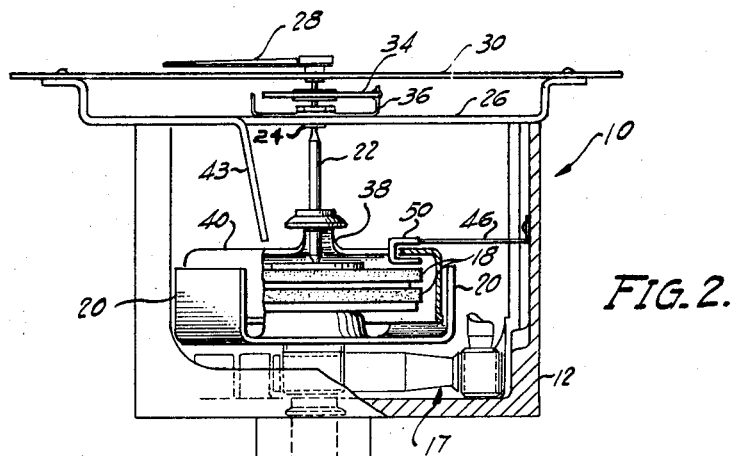
FIG. 2 is a sectional view taken along the line 2—2 in FIG. 1.
Figure 3:
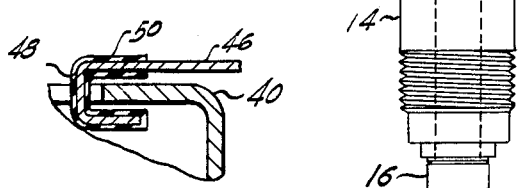
FIG. 3 is a fragmentary view of the magnetically susceptible material and speed cup for more clearly indicating their relationship.

In FIGS. 1 and 2, a speedometer is indicated generally by the reference character 10. The speedometer comprises a U-shaped frame member 12 having a rearwardly extending boss 14. A bearing in the boss journals a shaft 16, which is recessed at one end to receive the tip of a flexible shaft that drives the shaft. The shaft 16 is driven at a speed corresponding to that of the vehicle in which the speedometer 10 is mounted and a transmission gear assembly 17 operated by shaft 16 serves to control a conventional odometer (not shown) for registering vehicle mileage.

A permanent magnet 18 and field poles 20 spaced from the ends of magnet 18 are carried on the other end of shaft 16. The other end of the shaft 16 also rotatably supports one end of a pointer shaft 22. The pointer shaft 22 extends through a bearing 24 located in a bracket 26 carried by the arms of the U-shaped member 12. The protruding end of the pointer shaft 22 carries the pointer 28 adjacent a dial 30 on which are marked speed indications 32. The shaft 22 and pointer 28 are normally biased into a zero position by a torsion spring 34 whose tension is adjusted by means of a regulator 36.

Intermediate the bracket 26 and shaft 16, an arm 38 is fastened at one to shaft 22. The other end of the arm 38 has an integrally formed speed cup 40 formed thereon whose rim is interposed between the magnet 18 and the field poles 20. A generally circular central opening 42 coaxial with the axis of rotation of said cup is defined by the inner edge of the back wall of the speed cup. The generally circular edge of the opening 42 is therefore concentric with the axis of rotation of the speed cup and shaft 22. A stop 43 depending from bracket 226 is adapted to engage arm 38 to prevent more than 360° rotation of the speed cup. The speed cup constitutes an eddy current producing device or means controlled by the speed of the magnet for being driven to a position dependent on the speed of the magnet 18.

The bearings for shaft 22, while manufactured with considerable accuracy, still permit some walking of the shaft 22 and cup 40 as the cup is rotated by the magnet 18. This walking or precession is generally the result of ambient or extraneous vibrations, which are transmitted from some external source such as a bent flexible shaft, which may be whipping against the supporting structure. These ambient vibrations are transmitted to the speedometer housing or frame and are additively combined with the torque of the magnet at a variable rate so that the needle 28 is caused either or both to walk in one direction or to vibrate about its true reading as indicated by the broken lines 44 in FIG. 1. In order to break up or dispel the effect of these vibrations, the present invention incorporates a simple damping spring 46.

The spring 46 is of magnetic material such as soft iron and is cantilever mounted by supporting it at one end on one leg of the U-shaped frame member 12. A U-shaped formation 48 is provided on the end of spring 46 and it nests the inner edge of the opening 42 in the speed cup between the legs of the U. A plastic encapsulation 50 is provided for the U-formation 48.

As the magnet 18 rotates it periodically passes the formation 48 to attract the same. This occurs twice for each revolution of the magnet 18 in the arrangement shown herein. As the formation 48 is attracted to the magnet 18, one leg of the formation 48 engages the speed cup 40 to dampen its oscillation and after the magnet passes element 48, spring 46 returns the formation 48 to normal. The plastic encapsulation 50 serves to increase friction against the cup and to dampen the movement of both the spring 46 and the cup, while avoiding noise.

The foregoing constitutes a description of one embodiment of improved meter damping apparatus whose inventive concepts are believed set forth in the accompanying claims.

What is claimed is:
1. A speedometer comprising a magnet adapted to be rotated by a flexible shaft, a speed cup arranged for rotation by said magnet to a position dependent on the speed of rotation of said magnet, a cantilever spring supported at one end independently of said magnet speed cup, said speed cup having an opening whose edge is concentric with the axis of rotation of said cup, and a U-shaped magnetically susceptible element carried by said spring for periodic attraction to said magnet with the legs of said U nesting said edge whereby one of said legs engages said speed cup on attraction of said element by said magnet to dampen the effects of extraneous vibrations applied to said speed cup.

2. The speedometer claimed in claim 1 in which said one leg is located between said magnet and said speed cup and said speed cup opening edge is located between said magnet and the other leg of said element.

3. In the speedometer claimed in claim 1, a plastic material carried by at least one of said legs for engagement against said speed cup.

References Cited

UNITED STATES PATENTS

| | | | |
|---|---|---|---|
| 1,238,455 | 8/1917 | Stewart | 73—496 |
| 1,461,381 | 7/1923 | Dorsey | 73—496 |
| 2,117,212 | 5/1938 | Rodanet | 73—496 |
| 2,378,201 | 6/1945 | Dewan | 73—414 |
| 2,645,237 | 7/1953 | Wheeler | 73—526 X |

FOREIGN PATENTS 632,387    11/1949    Great Britain.

DAVID SCHONBERG, *Primary Examiner.*

DANIEL M. YASICH, *Assistant Examiner.*